(12) United States Patent
Motomura

(10) Patent No.: US 7,133,156 B2
(45) Date of Patent: Nov. 7, 2006

(54) COLOR MANAGEMENT APPARATUS AND COLOR MANAGEMENT SYSTEM

(75) Inventor: Hideto Motomura, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1000 days.

(21) Appl. No.: 10/132,129

(22) Filed: Apr. 26, 2002

(65) Prior Publication Data

US 2003/0016289 A1   Jan. 23, 2003

(30) Foreign Application Priority Data

Apr. 27, 2001   (JP) ............................. 2001-132191

(51) Int. Cl.
| H04N 1/60 | (2006.01) |
| G06F 3/14 | (2006.01) |
| G06K 9/00 | (2006.01) |
| G03F 3/08 | (2006.01) |

(52) U.S. Cl. ...................... 358/1.9; 358/1.15; 358/518; 382/162; 382/167

(58) Field of Classification Search ................ 358/1.9, 358/1.15, 518, 520, 504; 345/589, 591, 597, 345/600–604; 382/162, 167
See application file for complete search history.

(56) References Cited

U.S. PATENT DOCUMENTS

| 5,754,682 A | 5/1998 | Katoh |
| 5,864,364 A | 1/1999 | Ohyama et al. |
| 6,466,334 B1 | 10/2002 | Komiya et al. |
| 6,628,822 B1 * | 9/2003 | Nakabayashi et al. ...... 382/162 |
| 6,654,491 B1 | 11/2003 | Hidaka |

FOREIGN PATENT DOCUMENTS

| JP | 10-224646 | 8/1998 |
| JP | 11-085952 | 3/1999 |
| JP | 11-85952 | 3/1999 |

OTHER PUBLICATIONS

An article by Kohler et al., entitled "The Next Generation of Color Management System", 8th IS&T/SID Color Imaging conference: Color Science and Engineering Systems, Technologies, Applications held on Nov. 7-10, 2000, pp. 61-64.
English Language Abstract of JP 11-85952.
English Language Abstract of JP 10-224646.
English Language Abstract of JP 11-085952.

* cited by examiner

Primary Examiner—Kimberly Williams
Assistant Examiner—Charlotte M. Baker
(74) Attorney, Agent, or Firm—Greenblum & Bernstein, P.L.C.

(57) ABSTRACT

The present invention allows the transmitting side and receiving side to exchange the device characteristic, color matching function and visual environment information used according to task assignment of color reproduction pursuant with a color reproduction target, sets color control parameters on the transmitting side or color control parameters on the receiving side, and thereby allows the transmitting side and receiving side to share the color reproduction target in such a way as to be flexibly applicable to a plurality of color reproduction targets and assigned tasks of color reproduction.

16 Claims, 10 Drawing Sheets

COLOR MANAGEMENT APPARATUS AND COLOR MANAGEMENT SYSTEM

BACKGROUND OF THE INVENTION

1. Field of the Invention

The present invention relates to a color management apparatus and color management system to accurately control colors in a still image system or moving image system, which consists of image capturing using a still camera, video camera and scanner, etc., image transmission using the Internet or dedicated line, etc. and image display using a display, printer, etc.

2. Description of the Related Art

With the progress of digitalization of image processing apparatuses and network technologies centered on the Internet, a cross media system whereby a variety of image processing apparatuses are connected on an open system is becoming widespread on a full scale in recent years. An open system requires individual image processing apparatuses and applications to have a common interface and adopt a configuration with high-level versatility and expandability. From the standpoint of color reproduction, an image processing apparatus that transmits color information, that is, a camera or scanner needs to accurately deliver captured color information to the open system. On the other hand, an image processing apparatus that receives and displays color information, that is, a display or printer, needs to accurately display the color information received. For example, even if a camera acquires color information accurately, color reproduction of the overall system deteriorates with inappropriate color information shown on a display.

Accurate color management among a plurality of image processing apparatuses is becoming commercially practical with the emergence of an ICC profile recommended by the ICC (International Color Consortium). For example, Tim Kohler proposes a next-generation color management method, which also takes into account differences in a visual environment as an expansion of the ICC profile in "The Next Generation of Color Management System (8 th IS&T/SID Color Imaging Conference, P61 to p64)". On the other hand, there is also a proposal of a mode not limited to an ICC profile. For example, the Unexamined Japanese Patent Publication No. HEI 11-85952 discloses a color management apparatus capable of realizing accurate color reproduction even if illumination on the image capturing side (color information transmitting side) differs from illumination on the observing side (color information receiving side).

Furthermore, accurate color control among a plurality of image processing apparatuses requires a colorimetric value XYZ, which is an objective scale of color. Calculating the colorimetric value XYZ as the objective scale of color requires spectral reflectance $R_\lambda$, color matching function $(x'_\lambda, Y'_\lambda, z'_\lambda)$ and spectral distribution $E_\lambda$ of illumination of an object as shown in (Mathematical expression 1).

[Mathematical Expression 1]

$$\begin{bmatrix} X \\ Y \\ Z \end{bmatrix} = \begin{bmatrix} \sum_\lambda R_\lambda E_\lambda x'_\lambda d\lambda \\ \sum_\lambda R_\lambda E_\lambda y'_\lambda d\lambda \\ \sum_\lambda R_\lambda E_\lambda z'_\lambda d\lambda \end{bmatrix} \quad (1)$$

Therefore, when the image capturing side estimates spectral reflectance of the object and transmits this to the observing side and XYZ is calculated according to the spectral distribution of illumination on the observing side, it is possible to absorb differences in illumination and realize accurate color reproduction.

However, the above-described conventional color management apparatus has the following problems yet to be solved.

First, there is no means for controlling targets of color reproduction. A target of color reproduction is a target to control colorimetric value XYZ of an image to be reproduced by a display apparatus and there are as many types of color reproduction targets as combinations of types of spectral distribution of illumination of (Mathematical expression 1) and color matching function. For example, when the spectral distribution of illumination on the image capturing side is used as spectral distribution $E_\lambda$ of illumination and a CIE1931 color matching function specified by the CIE (International Commission of Illumination) is used as the color matching function $(x'_\lambda, y'_\lambda, Z'_\lambda)$, the colorimetric value XYZ calculated expresses colors of an object viewed by a CIE standard observer in image capturing illumination. Then, the target of color reproduction is to "reproduce colors when a CIE standard observer views an object in image capturing illumination". In this case, the color management apparatus needs to give the display apparatus an image signal that allows the display apparatus to display the "colors of an object viewed by a CIE standard observer in image capturing illumination".

On the other hand, when the spectral distribution of illumination on the observing side is used as spectral distribution $E_\lambda$ of illumination and a CIE1931 color matching function specified by the CIE is used as the color matching function $(x'_\lambda, y'_\lambda, z'_\lambda)$, the colorimetric value XYZ calculated expresses colors of an object viewed by a CIE standard observer in observation illumination. Then, the target of color reproduction is to "reproduce colors when a CIE standard observer views an object in observation illumination". In this case, the color management apparatus needs to give the display apparatus an image signal that allows the display apparatus to display the "colors of an object viewed by a CIE standard observer in observation illumination".

When the spectral distribution of illumination on the image capturing side differs from the spectral distribution of illumination on the observing side, the colorimetric value XYZ which becomes the target for control of the display apparatus is different. Thus, the image reproduced on the display apparatus has different colors.

The above problem is the one pointed out by the above-described conventional example. Furthermore, the Unexamined Japanese Patent Publication No.HEI 11-85952 discloses the means applicable to two targets of color reproduction by the image capturing side and receiving side having their respective spectral distributions of illumination.

However, the Unexamined Japanese Patent Publication No. HEI 11-85952 does not disclose how this target of color reproduction is determined, that is, the means for controlling the target of color reproduction and lacks a mechanism where by the image capturing side and the observing side can be connected without discrepancy so as to be flexibly applicable to the target of reproduction of a plurality of colors. That is, since there is no "protocol" that connects the image capturing side (color information transmitting side) and observing side (color information receiving side) over a network, there is a problem that a color reproduction intention cannot be exchanged appropriately between the image capturing side and the observing side.

For example, when the observing side sets "reproducing colors of an object viewed from a CIE standard observer in image capturing illumination" as the target of color reproduction, the observing side requests the image capturing side to send the spectral distribution of illumination for image capturing. However, when the image capturing side sets a target of color reproduction different from that of the observing side and sets "reproducing colors of an object viewed from a CIE standard observer in illumination of observation" as a target of color reproduction, spectral distribution $E_\lambda$ of illumination of (Mathematical expression 1) becomes illumination for observation. For this reason, the image capturing side has no intention to send the spectral distribution of illumination for image capturing to the observing side. This is an example of harmful effects when a common target for color reproduction is not set between the image capturing side and receiving side.

Furthermore, a target of color reproduction is defined in a variety of ways not only from the spectral distribution of illumination but also from differences in the color matching function. Thus, management of a target of color reproduction is a more important issue.

For example, when five observers have color matching functions differing from one another, there are five types of color matching function $(x'_\lambda, y'_\lambda, z'_\lambda)$ of (Mathematical expression 1). Thus, there are five sets of colorimetric value XYZ as the targets of the display apparatus. Since an infinite number of color reproduction targets are theoretically conceivable, it is impossible to design color reproduction unless a common target is set beforehand between the image capturing side and the observing side.

Second, there is no means for managing task assignment of color reproduction. Task assignment of color reproduction refers to assignment of different types of processing such as calculation of colorimetric value XYZ, estimation of spectral reflectance of images captured and colorimetric control of the display apparatus to different processing sections of the color management apparatus.

For example, when the image capturing side assumes all responsibility for color reproduction and executes all of estimation of spectral reflectance of images captured, calculation of colorimetric value XYZ and calculation of signals for the display apparatus, the image capturing side needs to send the colorimetric device characteristic of the display apparatus to the image capturing side. The image capturing side keeps track of the characteristic of the display apparatus, sends an image signal optimized for the display apparatus to the observing side and the observing side displays the image without applying colorimetric processing, and the target of color reproduction is achieved in this way.

On the contrary, when the observing side assumes all responsibility for color reproduction and executes all colorimetric processing, the output signal of the image capturing apparatus is directly sent to the observing side without being subjected to colorimetric processing. Then, the receiving side performs all processing of estimation of spectral reflectance of images captured, calculation of colorimetric value XYZ and calculation of all signals for the display apparatus and the target of color reproduction is achieved in this way.

Thus, the above-described conventional color management apparatus has a fixed process of colorimetric processing and is not constructed in such away as to flexibly assign a variety of tasks of color reproduction between the transmitting side and receiving side.

Third, there is no means for managing task assignment of color reproduction according to a target of color reproduction. This is a problem that combines the above-described first and second problems. That is, unless the image capturing side and the observing side have a common target for color reproduction, it is impossible to assign tasks of color reproduction between the image capturing side and the observing side and the color management apparatus does not function correctly. For color management that realizes accurate color reproduction, the color reproduction target should be checked between the image capturing side and the observing side and task assignment of color reproduction should be performed between the image capturing side and the observing side. However, the above-described conventional color management apparatus has no means for checking the color reproduction target with each other and has a fixed process of colorimetric processing. For this reason, the conventional color management apparatus is not constructed to flexibly meet a variety of color reproduction targets and color reproduction tasks assigned according to the color reproduction targets.

SUMMARY OF THE INVENTION

It is an object of the present invention to provide a color management apparatus and color management system flexibly applicable to a plurality of color reproduction targets and color reproduction tasks assigned.

In order to attain this object, the present invention allows the transmitting side and receiving side to share color reproduction targets, send/receive the characteristic of the device used, color matching function and visual environment information to/from each other according to task assignment of color reproduction processing according to the color reproduction targets, thus making it possible to set color control parameters on the transmitting side or set color control parameters on the receiving side.

This allows the transmitting side and receiving side to share color reproduction targets and flexibly meet a plurality of color reproduction targets and color reproduction tasks assigned.

Furthermore, the present invention is constructed of a transmitting side control section that exchanges a device characteristic, color matching function and visual environment information with the receiving side according to a color reproduction target and color reproduction task, sets color control parameters on the transmitting side and instructs image capturing, a receiving side control section that exchanges a device characteristic, color matching function and visual environment information with the transmitting side according to the color reproduction target and color reproduction task, sets color control parameters on the receiving side and instructs image display, a transmit image processing section that converts an image captured according to the instruction from the transmitting side control section to an image signal for transmission, a transmitting side device characteristic setting section that sets a colorimetric input/output characteristic of the device used to acquire images for the transmit image processing section according to the instruction from the transmitting side control section, a transmitting side color matching function setting section that sets a color matching function for the transmit image processing section according to the instruction from the transmitting side control section, a transmitting side visual environment setting section that sets visual environment information for the transmit image processing section according to the instruction from the transmitting side control section, a received image processing section that converts the image sent from the transmitting side to a display image signal according to the instruction from the transmitting side control section, a receiving side device characteristic setting section that sets a colorimetric input/output characteristic of the device used to display images on the received image processing section according to the instruction from the receiving side control section, a receiving side color matching function setting section that sets a color matching function for the received image processing section according to the instruction from the receiving side control section and a receiving side visual environment setting section that sets visual environment information for the received image processing section according to the instruction from the receiving side control section.

This makes it possible to meet a plurality of color reproduction targets due to differences in the spectral distribution of illumination between the transmitting side and the receiving side and differences in the color matching function of observers, supply processing sections that carry out estimation of spectral reflectance, calculation of colorimetric value XYZ and calculation of a display system reverse direction model of an object with their respective device characteristic, color matching function and spectral distribution of illumination and thereby appropriately assign color reproduction tasks.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the present invention will be explained in detail below.

(Embodiment 1)

Figure 1:
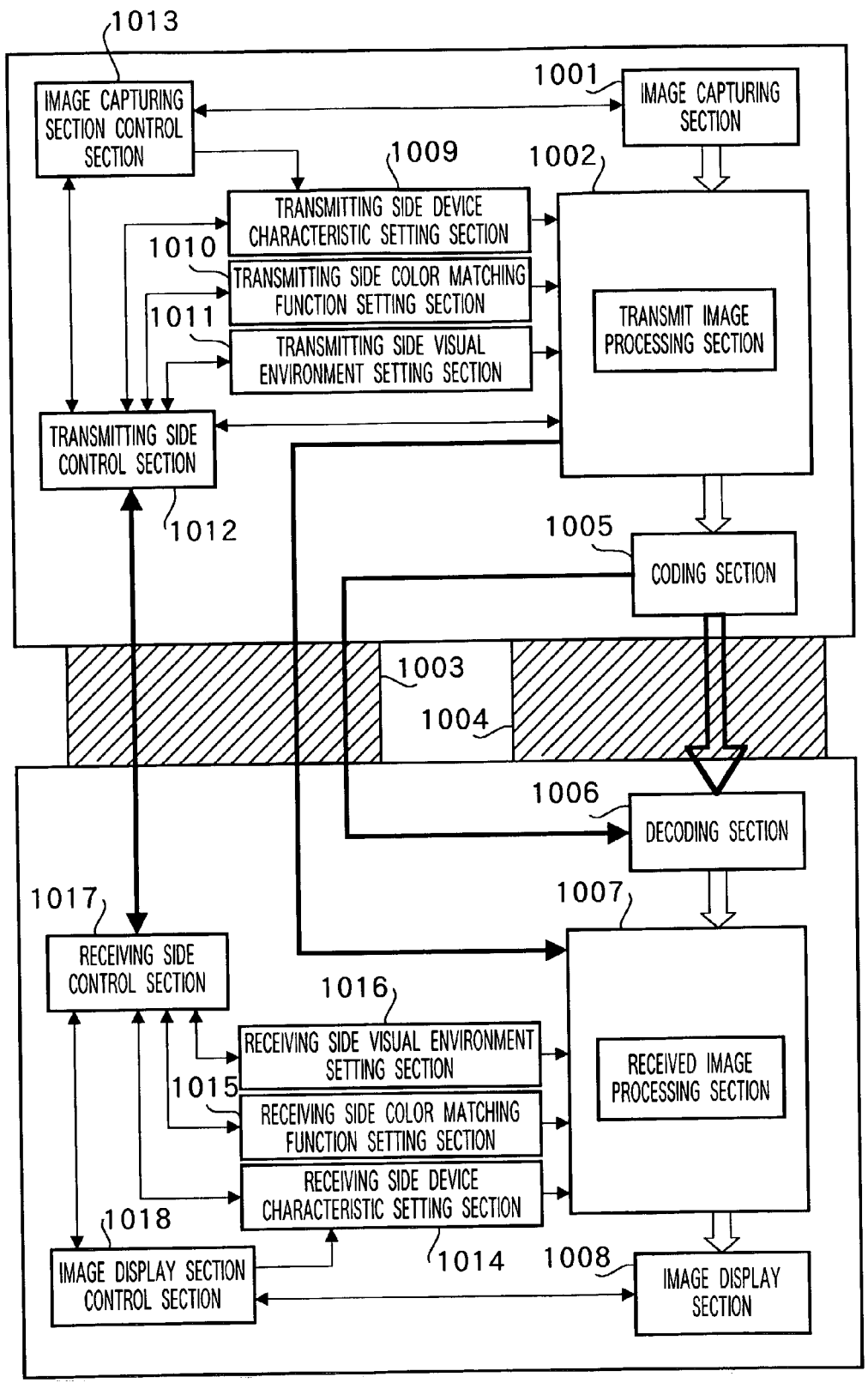
FIG. 1 illustrates a color management apparatus according to Embodiment 1 of the present invention capable of flexibly meeting a plurality of color reproduction targets and color reproduction tasks assigned.

FIG. 1 illustrates a block diagram of a color management apparatus according to Embodiment 1 of the present invention. The color management apparatus shown in FIG. 1 is constructed in such a way as to be flexibly applicable to a plurality of color reproduction targets and color reproduction tasks assigned.

First, a flow of image information will be explained. The image of an object is captured by image capturing section 1001 and supplied to transmit image processing section 1002. Image capturing section 1001 can capture images using a video camera, digital camera or scanner, etc. Furthermore, a VCR and optical disk such as CD-ROM and DVD-ROM or a magnetic disk, etc. which provide already recorded electronic information can also be used as specific means for image capturing. Image contents may also be natural reflecting objects taken by a video camera, etc. and computer graphics created by a colorimetrically controlled image display section.

Transmit image processing section 1002 performs estimation of spectral reflectance of an object, calculation of colorimetric value XYZ and calculation of signals for a display apparatus, etc. and sends image information to the observing side through two paths. A first transmission path is download type transmission path 1003, which sends image information in a file format. A second transmission path is packet type transmission path 1004, which sends image information in a stream format.

When transmit image processing section 1002 outputs image information to packet type transmission path 1004, coding section 1005 encodes and multiplexes the image signal. The stream format image information sent through packet type transmission path 1004 is demultiplexed and decoded by decoding section 1006 on the observing side, which is the receiving side.

The output of decoding section 1006 is delivered to received image processing section 1007. Received image processing section 1007 converts the delivered image information to an image signal for which accurate color reproduction is guaranteed on the display apparatus through estimation of spectral reflectance of the object, calculation of colorimetric value XYZ and calculation of signals for the display apparatus and outputs the image signal to image display section 1008.

By the way, the present invention does not limit the type of the display apparatus, and is also applicable to a soft copy system such as a CRT monitor, LCD monitor, projector or a hard copy system such as printing and photography.

It is also possible to store the image information converted to a stream format by coding section 1005 in a file format and send to the observing side through download type transmission path 1003. That is, the file format image information from transmit image processing section 1002 and the file format image information from coding section 1005 are passed through download type transmission path 1003.

Second, the transmitting side of the color management related processing system will be explained. Transmit image processing section 1002 is given color control parameters, which are information necessary for color management, from transmit side device characteristic setting section 1009, transmitting side color matching function setting section 1010, transmitting side visual environment setting section 1011 and transmitting side control section 1012.

Transmit side device characteristic setting section 1009 gives the colorimetric input/output characteristic of image capturing section 1001 received from image capturing section control section 1013 as a color control parameter to transmit image processing section 1002. Then, transmit image processing section 1002 estimates spectral reflectance R of the object from output signal $V_i$ of image capturing section 1001 using the colorimetric input/output characteristic of image capturing section 1001. That is, transmit side device characteristic setting section 1009 is used to estimate spectral reflectance R of the object from output signal $V_i$ of image capturing section 1001.

Transmitting side color matching function setting section 1010 gives color matching function $(x'_\lambda, Y'_\lambda, Z'_\lambda)$ as a color control parameter to transmit image processing section 1002 and transmitting side visual environment setting section 1011 gives spectral distribution $E_\lambda$ of illumination as a color control parameter to transmit image processing section 1002. Then, transmitting side image processing section 1002 combines the color matching function and spectral distribution with spectral reflectance R of the object and calculates XYZ three stimulus values which are colorimetric value according to (Mathematical expression 1).

In addition, as will be described later, transmitting side control section 1012 gives color matching function $(x'_\lambda, Y'_\lambda, z'_\lambda)$ on the receiving side and spectral distribution $E_\lambda$ of illumination and the colorimetric input/output characteristic of the image display section to transmit image processing section 1002 as color control parameters.

Therefore, transmit image processing section 1002 can acquire information on all of color matching function $(x'_\lambda, y'_\lambda, z'_\lambda)$, spectral distribution $E_\lambda$ of illumination and colorimetric input/output characteristic of the image display section for both the transmitting side and receiving side. As a result, transmit image processing section 1002 can selectively apply color matching function $(x'_\lambda, y'_\lambda, Z'_\lambda)$ and spectral distribution $E_\lambda$ of illumination on the transmitting side and receiving side when calculating colorimetric value XYZ using (Mathematical expression 1). That is, transmit image processing section 1002 is provided with a mechanism capable of calculating appropriate colorimetric value XYZ according to various color reproduction targets.

For example, when transmit image processing section 1002 is supplied with color matching function $(x'_\lambda, y'_\lambda, Z'_{80})$ from the transmitting side and spectral distribution $E_\lambda$ of illumination from the transmitting side, colorimetric value XYZ is defined as a color when an object is illuminated with image capturing illumination on the transmitting side and viewed with the color matching function of the observer on the transmitting side.

The display apparatus is controlled so that colorimetric value XYZ of the displayed color matches colorimetric value XYZ of the object. In this case, the display apparatus is controlled so that colorimetric value XYZ of the displayed color matches the color of the object illuminated with image capturing illumination on the transmitting side and viewed with the color matching function of the observer on the transmitting side. This means that matching colorimetric value XYZ of the displayed color with the color of the object illuminated with image capturing illumination on the transmitting side and viewed with the color matching function of the observer on the transmitting side is defined as the target of color reproduction. This target is named "color reproduction target #1" for convenience' sake.

Then, when transmit image processing section 1002 is supplied with color matching function $(x'\lambda, y'\lambda, z'\lambda)$ from the transmitting side and spectral distribution $E\lambda$ of illumination from the receiving side, colorimetric value XYZ to be calculated by transmit image processing section 1002 is defined as a color when an object is illuminated with observation illumination on the receiving side and viewed with the color matching function of the observer on the transmitting side. This means that matching colorimetric value XYZ of the displayed color of the display apparatus with the color of the object illuminated with observation illumination on the receiving side and viewed with the color matching function of the observer on the transmitting side is defined as the target of color reproduction. This target is named "color reproduction target #2" for the sake of convenience.

Furthermore, when transmit image processing section 1002 is supplied with color matching function $(x'\lambda, y'\lambda, z'\lambda)$ from the receiving side and spectral distribution $E\lambda$ of illumination from the transmitting side, colorimetric value XYZ to be calculated by transmit image processing section 1002 is defined as a color when an object is illuminated with image capturing illumination on the transmitting side and viewed with the color matching function of the observer on the receiving side. This means that matching colorimetric value XYZ of the displayed color of the display apparatus with the color of the object illuminated with image capturing illumination on the transmitting side and viewed with the color matching function of the observer on the receiving side is defined as the target of color reproduction. This target is named "color reproduction target #3" for the sake of convenience.

Finally, when transmit image processing section 1002 is supplied with color matching function $(x'\lambda, y'\lambda, z'\lambda)$ from the receiving side and spectral distribution $E\lambda$ of illumination from the receiving side, colorimetric value XYZ to be calculated by transmit image processing section 1002 is defined as a color when an object is illuminated with observation illumination on the receiving side and viewed with the color matching function of the observer on the receiving side. This means that matching colorimetric value XYZ of the displayed color of the display apparatus with the color of the object illuminated with observation illumination on the receiving side and viewed with the color matching function of the observer on the receiving side is defined as the target of color reproduction. This target is named "color reproduction target #4" for the sake of convenience.

As shown above, four types of color reproduction target can be defined based on differences in the color matching function and spectral distribution of illumination as shown in Table 1.

TABLE 1

| COLOR REPRODUCTION TARGET | ILLUMINATION | COLOR MATCHING FUNCTION |
|---|---|---|
| 1 | IMAGE CAPTURING ILLUMINATION (TRANSMITTING SIDE) | TRANSMITTING SIDE |
| 2 | OBSERVING SIDE (RECEIVING SIDE) | TRANSMITTING SIDE |
| 3 | IMAGE CAPTURING ILLUMINATION (TRANSMITTING SIDE) | RECEIVING SIDE |
| 4 | OBSERVING SIDE (RECEIVING SIDE) | RECEIVING SIDE |

Then, the color management apparatus shown in FIG. 1 has a configuration applicable to any one of four color reproduction targets.

Furthermore, transmit image processing section 1002 has the colorimetric input/output characteristics of the image capturing apparatus and image display section, and can thereby perform both estimation of spectral reflectance of the object, calculation of signals for the display apparatus. This allows task assignment of color reproduction corresponding to the format in which the transmitting side assumes all color reproduction processing as in the case of broadcasting. Furthermore, the transmitting side performs no more than calculation of colorimetric value XYZ and the receiving side that has received colorimetric value XYZ can also assume the task of color reproduction of calculating signals for the own display apparatus. For the sake of convenience, the first task of color reproduction when the transmitting side assumes all color reproduction processing is named "color reproduction task assignment #1". The second task of color reproduction when the transmitting side is on a par with the receiving side in the task of color reproduction is named "color reproduction task assignment #2". Lastly, the task of color reproduction when the transmitting side carries out no color reproduction related processing, directly sends output signal Vi of image capturing section 1001 to the receiving side, and the receiving side estimates spectral reflectance of the object and calculates signals for the display apparatus is named "color reproduction task assignment #3".

As shown above, Table 2 provides a summary of the above-described three tasks assigned of color reproduction.

Then, the color management apparatus shown in FIG. 1 has a configuration applicable to any one of the three tasks assigned of color reproduction through an arrangement between the transmitting side and the receiving side, which will be described later.

Third, the processing system related to color management on the receiving side will be explained. The receiving side also has the same function as that of the transmitting side and received image processing section 1007 is given information necessary for color management from receiving side device characteristic setting section 1014, receiving side color matching function setting section 1015, receiving side visual environment setting section 1016 and receiving side control section 1017.

Receiving side device characteristic setting section 1014 gives the colorimetric input/output characteristic of image display section 1008 obtained from image display section control section 1018 to received image processing section 1007. Received image processing section 1007 calculates a signal for the display apparatus aiming at matching of the signal for the display apparatus with colorimetric value XYZ of the object.

Receiving side color matching function setting section 1015 gives color matching function $(x'_\lambda, y'_\lambda, z'_\lambda)$ as a color control parameter to received image processing section 1007 and receiving side visual environment setting section 1016 gives spectral distribution $E_\lambda$ of illumination as a color control parameter to received image processing section 1007. Received image processing section 1007 calculates XYZ three stimulus values, which are colorimetric value, by combining the color matching function and spectral distribution of illumination with spectral reflectance R of the object according to (Mathematical expression 1).

In addition, as will be described later, receiving side control section 1017 gives color matching function $(x'_\lambda, y'_\lambda, z'_\lambda)$, spectral distribution $E_\lambda$ of illumination on the transmitting side and colorimetric input/output characteristic of the image capturing apparatus to received image processing section 1007.

Therefore, received image processing section 1007 can acquire color matching function $(x'_\lambda, y'_\lambda, Z'_\lambda)$, spectral distribution $E_\lambda$ of illumination and colorimetric input/output characteristic of the image capturing apparatus as color control parameters for both the transmitting side and the receiving side.

TABLE 2

| COLOR REPRODUCTION TASK ASSIGNMENT | COLOR SIGNAL CONVERSION | |
|---|---|---|
| | TRANSMITTING SIDE | RECEIVING SIDE |
| 1 | ESTIMATION OF SPECTRAL REFLECTANCE CALCULATION OF COLORIMETRIC VALUE XYZ CALCULATION OF SIGNAL FOR DISPLAY APPARATUS | NONE |
| 2 | ESTIMATION OF SPECTRAL REFLECTANCE CALCULATION OF COLORIMETRIC VALUE XYZ (OR MAIN COMPONENT COEFFICIENT OF SPECTRAL REFLECTANCE) | CALCULATION OF SIGNAL FOR DISPLAY APPARATUS (CALCULATION OF COLORIMETRIC VALUE XYZ WHEN MAIN COMPONENT COEFFICIENT OF SPECTRAL REFLECTANCE IS RECEIVED) |
| 3 | NONE | ESTIMATION OF SPECTRAL REFLECTANCE CALCULATION OF COLORIMETRIC VALUE XYZ CALCULATION OF SIGNAL FOR DISPLAY APPARATUS |

Furthermore, received image processing section 1007 has the colorimetric input/output characteristics of the image capturing apparatus and the image display apparatus as color control parameters, and can thereby perform both estimation of spectral reflectance of the object and calculation of a signal for the display apparatus.

The above-described configuration allows flexible color management according to the "four color reproduction targets" and "three color reproduction tasks assigned" as described above.

Fourth, communication between transmitting side control section 1012 and receiving side control section 1017 will be explained. Color management is carried out aiming at matching colorimetric value XYZ of the reproduced object with colorimetric value XYZ of the image capturing object. Therefore, an operation of the color management apparatus starts with a definition of colorimetric value XYZ of the image capturing object. This is the above-described "four color reproduction targets". After the targets of color reproduction are determined, the components of the color management apparatus operate with their respective tasks assigned, which allows colorimetric value XYZ of the reproduced object to match with XYZ of the image capturing object defined according to the targets of color reproduction for the color management apparatus as a whole.

Figure 2:
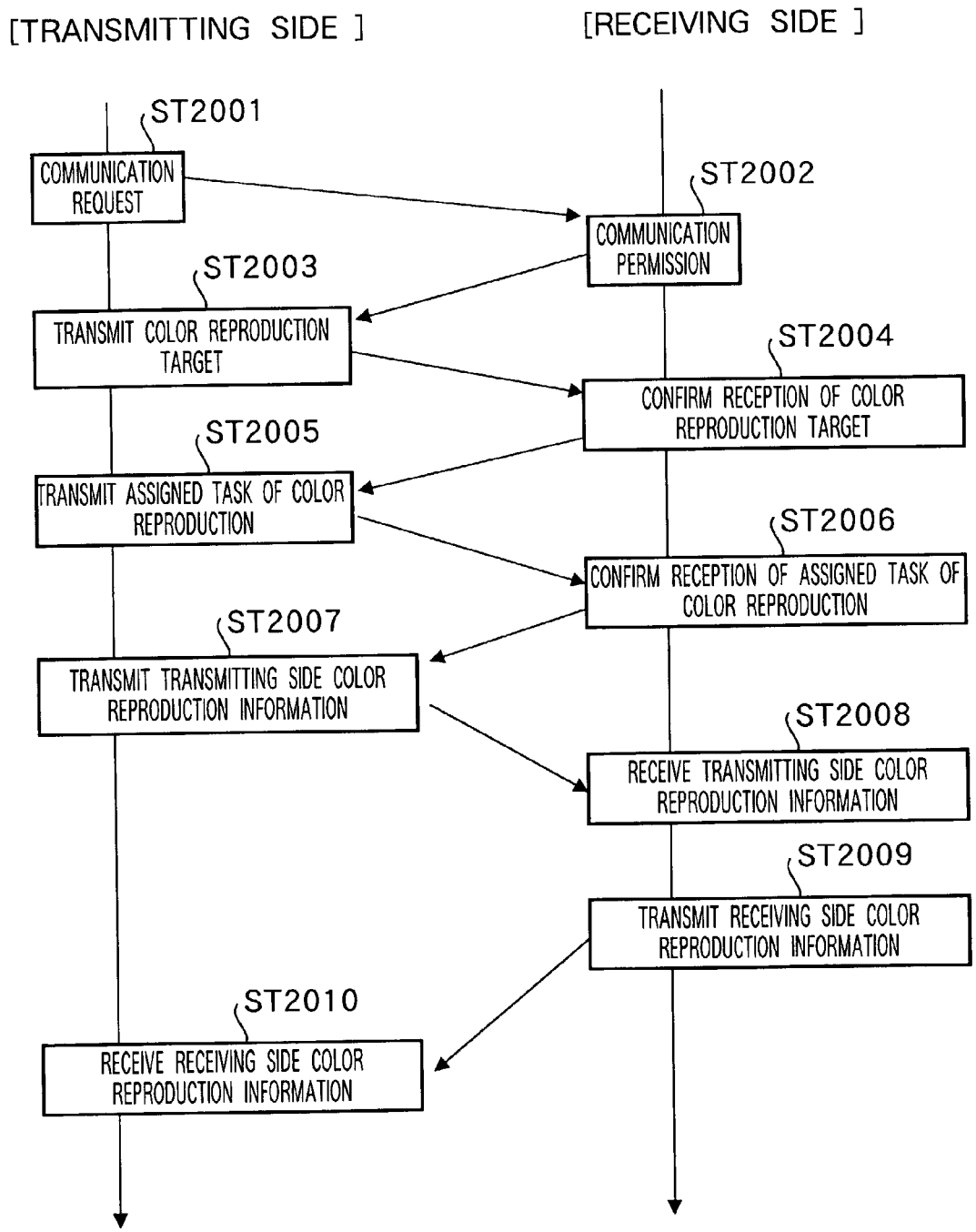
FIG. 2 illustrates a case where a transmitting side sends a communication request to a receiving side in a procedure for making an arrangement about color management.
Figure 3:
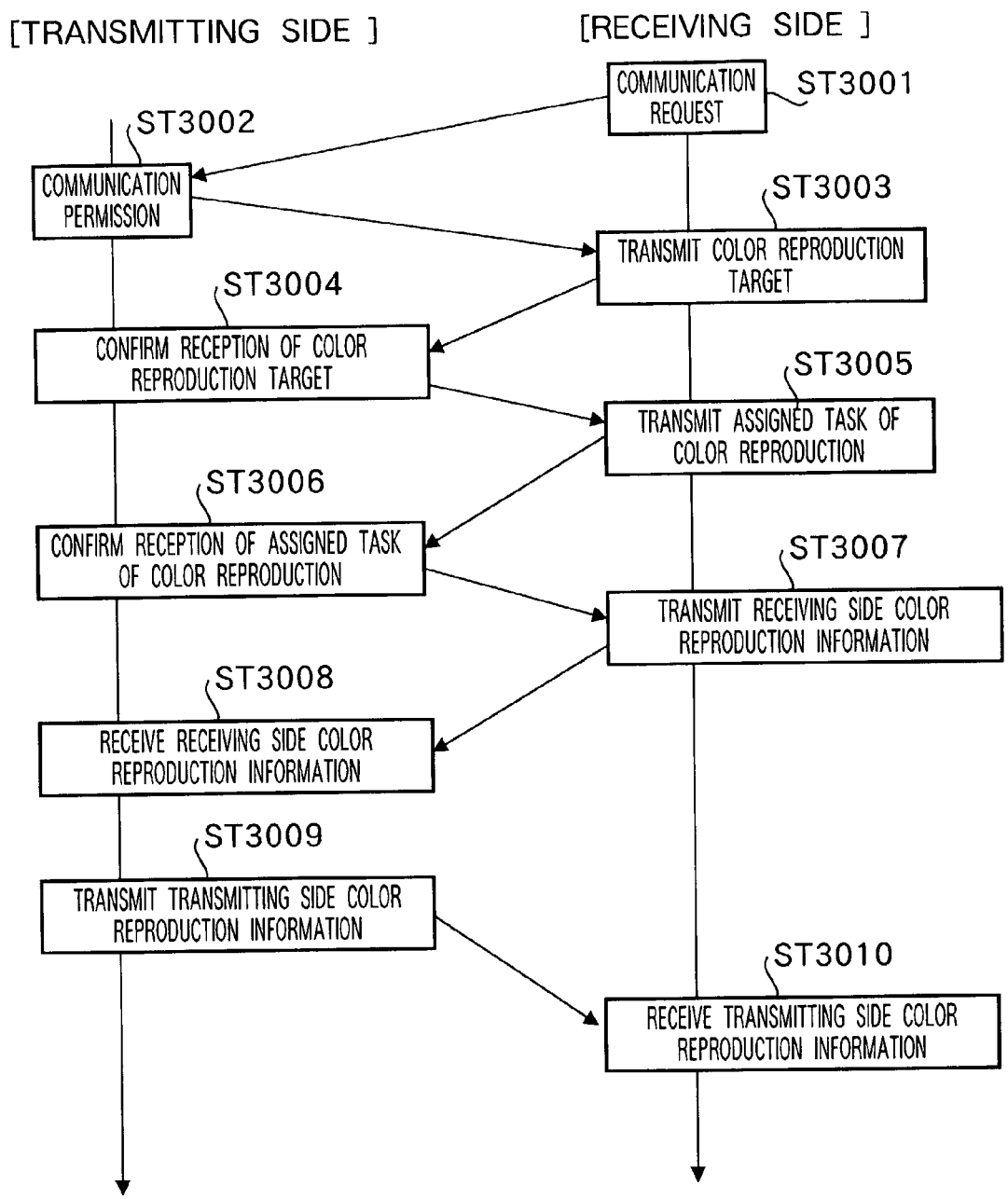
FIG. 3 illustrates a case where a receiving side sends a communication request to a transmitting side in a procedure for making an arrangement about color management.

Realizing the above-described flow requires an arrangement about color management between the transmitting side and the receiving side. FIG. 2 and FIG. 3 show a procedure for making an arrangement about color management. FIG. 2 shows a case where the transmitting side sends a communication request to the receiving side and FIG. 3 shows a case where the receiving side sends a communication request to the transmitting side.

FIG. 2 will be explained. Transmitting side control section 1012 on the transmitting side sends a communication request to receiving side control section 1017 on the receiving side (ST2001). Receiving side control section 1017 that has received this request sends back a communication permission to transmitting side control section 1012 (ST2002). This allows the transmitting side and receiving side to get ready for communication.

Then, transmitting side control section 1012 sends a color reproduction target to the receiving side (ST2003). Receiving side control section 1017 that has received this color reproduction target sends back a confirmation of reception of the color reproduction target to transmitting side control section 1012 (ST2004). This allows the transmitting side and receiving side to have common recognition about the color reproduction target.

Then, transmitting side control section 1012 sends a color reproduction task to receiving side control section 1017 (ST2005). Receiving side control section 1017 that has received this color reproduction task sends back a confirmation of reception of the color reproduction task to transmitting side control section 1012 (ST2006). This allows the transmitting side and receiving side to have common recognition about the color reproduction task.

With the above-described procedure, an arrangement about the target of color reproduction and the task of color reproduction is completed, and therefore transmitting side control section 1012 and receiving side control section 1017 then transmit/receive color matching function ($x'_\lambda, y'_\lambda, z'_\lambda$), spectral distribution $E_\lambda$ of illumination on the transmitting side and colorimetric input/output characteristic of the image capturing apparatus, which are color control parameters.

Transmitting side control section 1012 sends transmitting side color reproduction information which is a color control parameter necessary for the receiving side to receiving side control section 1017 based on the target of color reproduction and the task of color reproduction (ST2007). Receiving side control section 1017 receives the transmitting side color reproduction information (ST2008) and then sends receiving side color reproduction information, which is a necessary color control parameter to transmitting side control section 1012 based on the target of color reproduction and the task of color reproduction (ST2009). Then, transmitting side control section 1012 receives necessary receiving side color reproduction information (ST2010).

With the above-described procedure, the setting on color management is completed for both the transmitting side and receiving side and transmitting side control section 1012 instructs image capturing section 1001 to start video signal processing through image capturing section control section 1013.

Then, FIG. 3 will be explained. The processing shown in FIG. 3 is opposite to the processing shown in FIG. 2. First, receiving side control section 1017 sends a communication request to transmitting side control section 1012 (ST3001). Transmitting side control section 1012 that has received this request sends back a communication permission to receiving side control section 1017 (ST3002). This allows the transmitting side and receiving side to get ready for communication.

Then, receiving side control section 1017 sends a color reproduction target to transmitting side control section (ST3003). Transmitting side control section 1012 that has received this color reproduction target sends back a confirmation of reception of the color reproduction target to receiving side control section 1017 (ST3004). This allows the receiving side and transmitting side to have common recognition about the color reproduction target.

Then, receiving side control section 1017 sends a color reproduction task to transmitting side control section 1012 (ST3005). Transmitting side control section 1012 that has received this color reproduction task sends back a confirmation of reception of the color reproduction task to receiving side control section 1017 (ST3006). This allows the receiving side and transmitting side to have common recognition about the color reproduction task.

With the above-described procedure, arrangements about the target of color reproduction and the task of color reproduction are completed, and therefore the transmitting side and receiving side then transmit/receive color matching function ($x'_\lambda, y'_\lambda, z'_\lambda$), spectral distribution $E_\lambda$ of illumination and colorimetric input/output characteristic of the image capturing apparatus, which are color control parameters.

Receiving side control section 1017 sends receiving side color reproduction information which is a necessary color control parameter to transmitting side control section 1012 based on the target of color reproduction and the task of color reproduction (ST3007). Transmitting side control section 1012 receives the receiving side color reproduction information (ST3008) and then sends transmitting side color reproduction information, which is a necessary color control parameter to receiving side control section 1017 based on the target of color reproduction and the task of color reproduction (ST3009). Then, receiving side control section 1017 receives necessary transmitting side color reproduction information (ST3010).

With the above-described procedure, the setting on color management is completed for both the receiving side and transmitting side and receiving side control section 1017 instructs image capturing section 1001 to start image signal processing through image capturing section control section 1013.

As shown above, Embodiment 1 can provide a color management apparatus capable of appropriately operating the processing sections according to four color reproduction targets defined based on differences in the color matching function of illumination and spectral distribution of illumination between the image capturing side and observing side, according to which of the transmitting side or the receiving side plays the main role of color reproduction processing or whether both sides carry out color reproduction processing on an equal basis.

By the way, it is actually difficult to completely match colorimetric value XYZ of the reproduced object with colorimetric value XYZ of the image capturing object and a certain allowable error range is normally provided. An allowable error is defined as a range in which an observer does not perceive any color difference between the image capturing object and reproduced object. That is, when the observer feels no difference even if the XYZ values are different, the difference in the XYZ values constitutes no problem from the standpoint of color reproduction. Since the allowable error is affected by various factors such as components of the color management system, evaluation criteria of the observer, contents of the image capturing object and visual environment, etc., it is difficult to define a standardized allowable error. The definition method is unrelated to the present invention and the allowable error is an issue to be handled separately by other means.

Moreover, XYZ three stimulus values are used as colorimetric value, but it is also possible to use LAB, LUV, lightness, brightness, chroma, colorfulness, saturation and hue, which represent attributes of appearance of colors and the present invention will not limit the types of colorimetric value.

Furthermore, this embodiment constructs the color management system with only two systems on the transmitting side and receiving side, but it is also possible to provide a third system to perform central control over these two systems and allow this third system to instruct operations of the transmitting side and receiving side.

(Embodiment 2)

Figure 4:
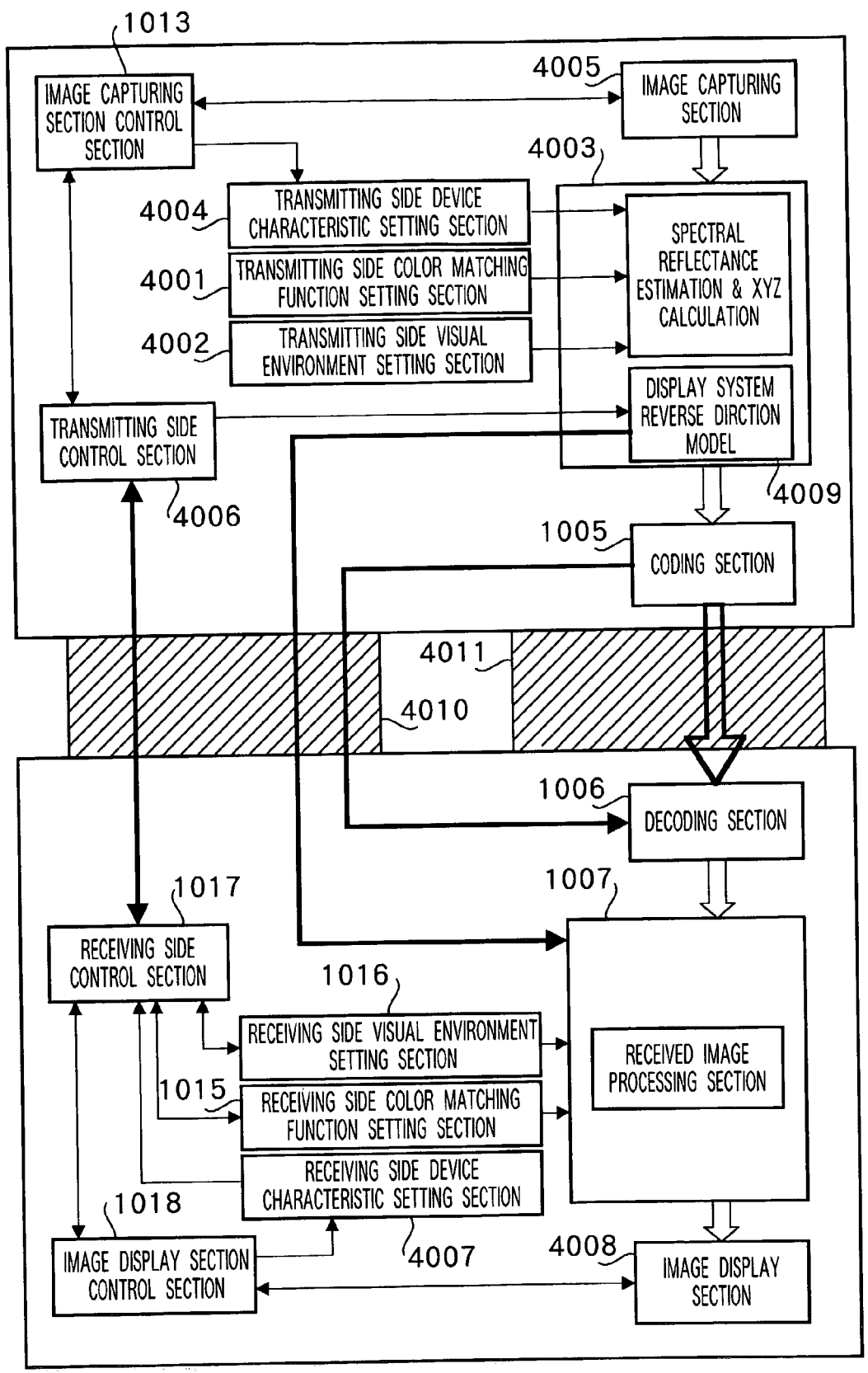
FIG. 4 illustrates a color management apparatus according to Embodiment 2 of the present invention applicable to a color reproduction target #1 and color reproduction task assignment #1.

FIG. 4 shows a functional block diagram of a color management system according to Embodiment 2 of the present invention. The color management system shown in FIG. 4 is constructed in such a way as to be applicable to color reproduction target #1 and color reproduction task assignment #1. The parts having the same functions as those in the functional block of the color management system shown in FIG. 1 are assigned the same reference numerals.

First, color reproduction target #1 will be explained. As shown in Table 1, color reproduction target #1 is to reproduce the color of an object when viewed in image capturing illumination (transmitting side) with the color matching function of the observer on the transmitting side. Therefore, in calculation of colorimetric value XYZ, transmitting side color matching function setting section 4001 supplies a color matching function, which is a color control parameter and transmitting side visual environment setting section 4002 supplies, a spectral distribution of illumination, which is a color control parameter.

Second, color reproduction task assignment #1 will be explained. As shown in Table 2, the transmitting side plays the main role of color reproduction task assignment #1 and transmit image processing section 4003 executes all processing. The output of transmit image processing section 4003 also becomes signal Vo for the display apparatus. Thus, for estimation of spectral reflectance of the object, transmitting side device characteristic setting section 4004 supplies the colorimetric input/output characteristic of image capturing section 4005, which is a color control parameter, to transmit image processing section 4003. Furthermore, to calculate signal Vo for the display apparatus, the colorimetric input/output characteristic of image display section 4008, which is a color control parameter, is supplied to transmit image processing section 4003 from receiving side device characteristic setting section 4007 through transmitting side control section 4006.

Third, the flow of color signal conversion will be explained. Image capturing section 4005 supplies signal $V_i$ of the captured image to transmit image processing section 4003. Transmit image processing section 4003 estimates spectral reflectance of the object based on signal $V_i$ of the captured image and the colorimetric input/output characteristic of the image capturing apparatus sent from transmitting side device characteristic setting section 4004. Transmit image processing section 4003 converts the spectral reflectance to colorimetric value XYZ using the color matching function sent from transmitting side color matching function setting section 4001 and spectral distribution of illumination sent from transmitting side visual environment setting section 4002.

Display system reverse direction model 4009 converts colorimetric value XYZ to signal Vo for the display apparatus based on the colorimetric input/output characteristic of the image display apparatus given from receiving side device characteristic setting section 4007. Signal Vo for the display apparatus is sent to the receiving side through download type transmission path 4010 or packet type transmission path 4011 and delivered to image display section 4008.

As shown above, Embodiment 2 can provide a color management system capable of appropriately operating each processing section to achieve color reproduction target #1 and color reproduction task assignment #1.

(Embodiment 3)

Figure 5:
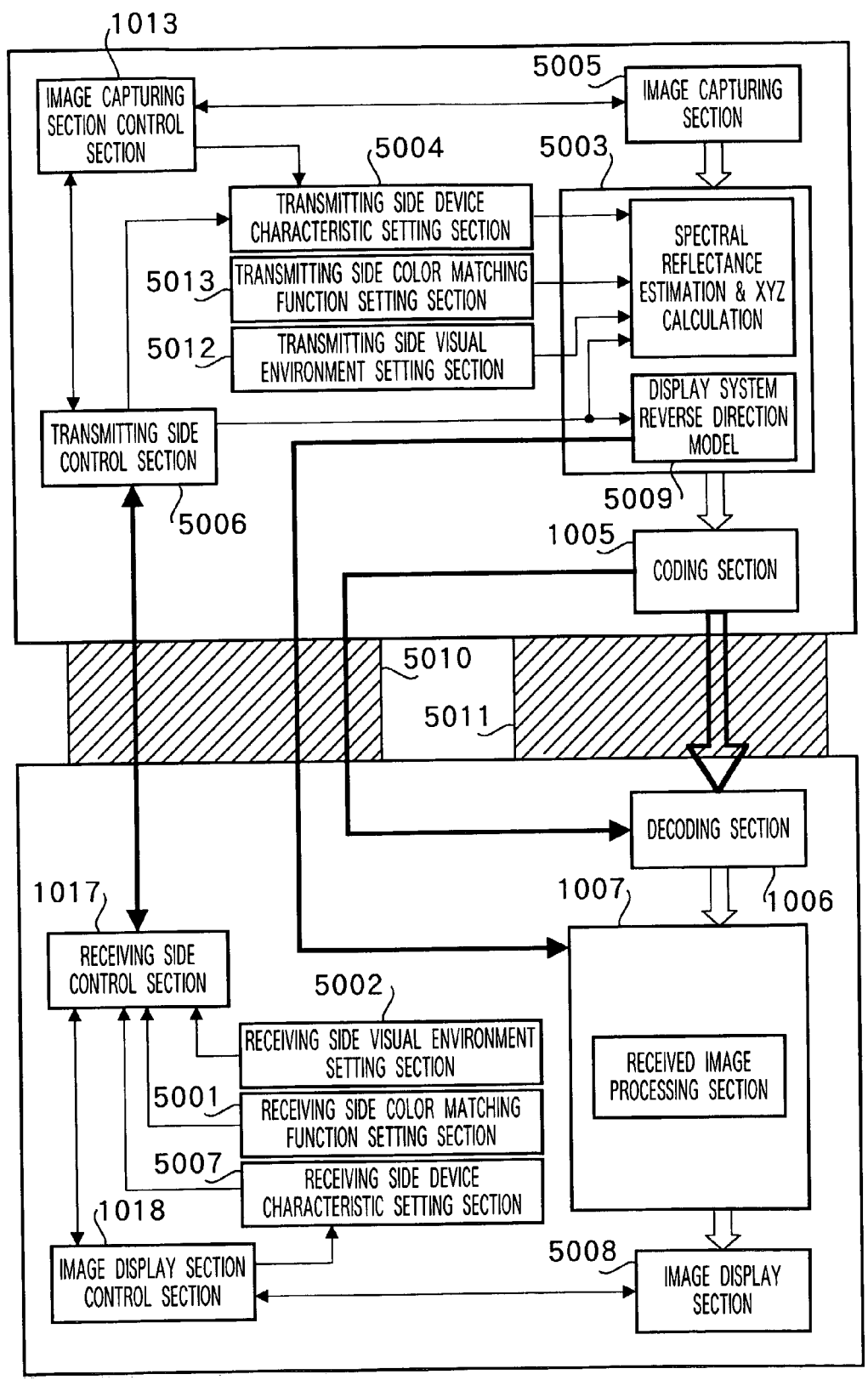
FIG. 5 illustrates a color management apparatus according to Embodiment 3 of the present invention applicable to a color reproduction target #4 and color reproduction task assignment #1.

FIG. 5 shows a functional block diagram of a color management apparatus according to Embodiment 3 of the present invention. The color management apparatus shown in FIG. 5 is constructed in such a way as to be applicable to color reproduction target #4 and color reproduction task assignment #1. The part shaving the same functions as those in the functional block of the color management system shown in FIG. 1 are assigned the same reference numerals.

First, color reproduction target #4 will be explained. As shown in Table 1, color reproduction target #4 is to reproduce the color of an object when viewed in observation illumination (receiving side) with the color matching function of the observer on the receiving side. Therefore, in calculation of colorimetric value XYZ, receiving side color matching function setting section 5001 supplies a color matching function, which is a color control parameter and receiving side visual environment setting section 5002 supplies a spectral distribution of illumination, which is a color control parameter.

Second, color reproduction task assignment #1 will be explained. As shown in Table 2, the transmitting side plays the main role of color reproduction task assignment #1 and transmit image processing section 5003 executes all processing. The output of transmit image processing section 5003 also becomes signal Vo for the display apparatus. Thus, for estimation of spectral reflectance of the object, transmitting side device characteristic setting section 5004 supplies the colorimetric input/output characteristic of image capturing section 5005, which is a color control parameter, to transmit image processing section 5003. Furthermore, to calculate colorimetric value XYZ of the object, transmit image processing section 5003 is supplied with the color matching function of the observer on the receiving side, which is a color control parameter, from receiving side color matching function setting section 5001 through transmitting side control section 5006 and illumination (observation illumination) on the receiving side, which is a color control parameter, from receiving side visual environment setting section 5002. In addition, to calculate signal Vo for the display apparatus, transmit image processing section 5003 is supplied with the colorimetric input/output characteristic of the image display apparatus of image display section 5008, which is a color control parameter, from receiving side device characteristic setting section 5007 through transmitting side control section 5006.

Third, the flow of color signal conversion will be explained. Image capturing section 5005 supplies signal $V_i$ of the captured image to transmit image processing section 5003. Transmit image processing section 5003 estimates spectral reflectance of the object based on signal $V_i$ of the captured image and the colorimetric input/output characteristic of the image capturing apparatus sent from transmitting side device characteristic setting section 5004. Transmit image processing section 5003 converts the spectral reflectance to colorimetric value XYZ using the color matching function sent from receiving side color matching function setting section 5001 and spectral distribution of illumination sent from receiving side visual environment setting section 5002.

Display system reverse direction model 5009 converts colorimetric value XYZ to signal Vo for the display apparatus based on the colorimetric input/output characteristic of the image display apparatus given from receiving side device characteristic setting section 5007. Signal Vo for the display apparatus is sent to the receiving side through download type transmission path 5010 or packet type transmission path 5011 and delivered to image display section 5008.

As shown above, Embodiment 3 can provide a color management system capable of appropriately operating each processing section to achieve color reproduction target #4 and color reproduction task assignment #1.

By the way, a configuration of the color management apparatus applicable to color reproduction target #2 and color reproduction task assignment #1 can be simply understood in this embodiment. That is, as shown in Table 1, since the spectral distribution of illumination is on the receiving side and the color matching function is on the transmitting side according to color reproduction target #2, XYZ in transmit image processing section 5003 is calculated using the information from transmitting side visual environment setting section 5012 and receiving side color matching function setting section 5007.

Likewise, a configuration of the color management apparatus applicable to color reproduction target #3 and color reproduction task assignment #1 can be simply understood in this embodiment. That is, as shown in Table 1, since the spectral distribution of illumination is on the transmitting side and the color matching function is on the receiving side according to color reproduction target #3, XYZ in transmit image processing section 5003 is calculated using the information from receiving side visual environment setting section 5008 and transmitting side color matching function setting section 5013.

(Embodiment 4)

Figure 6:
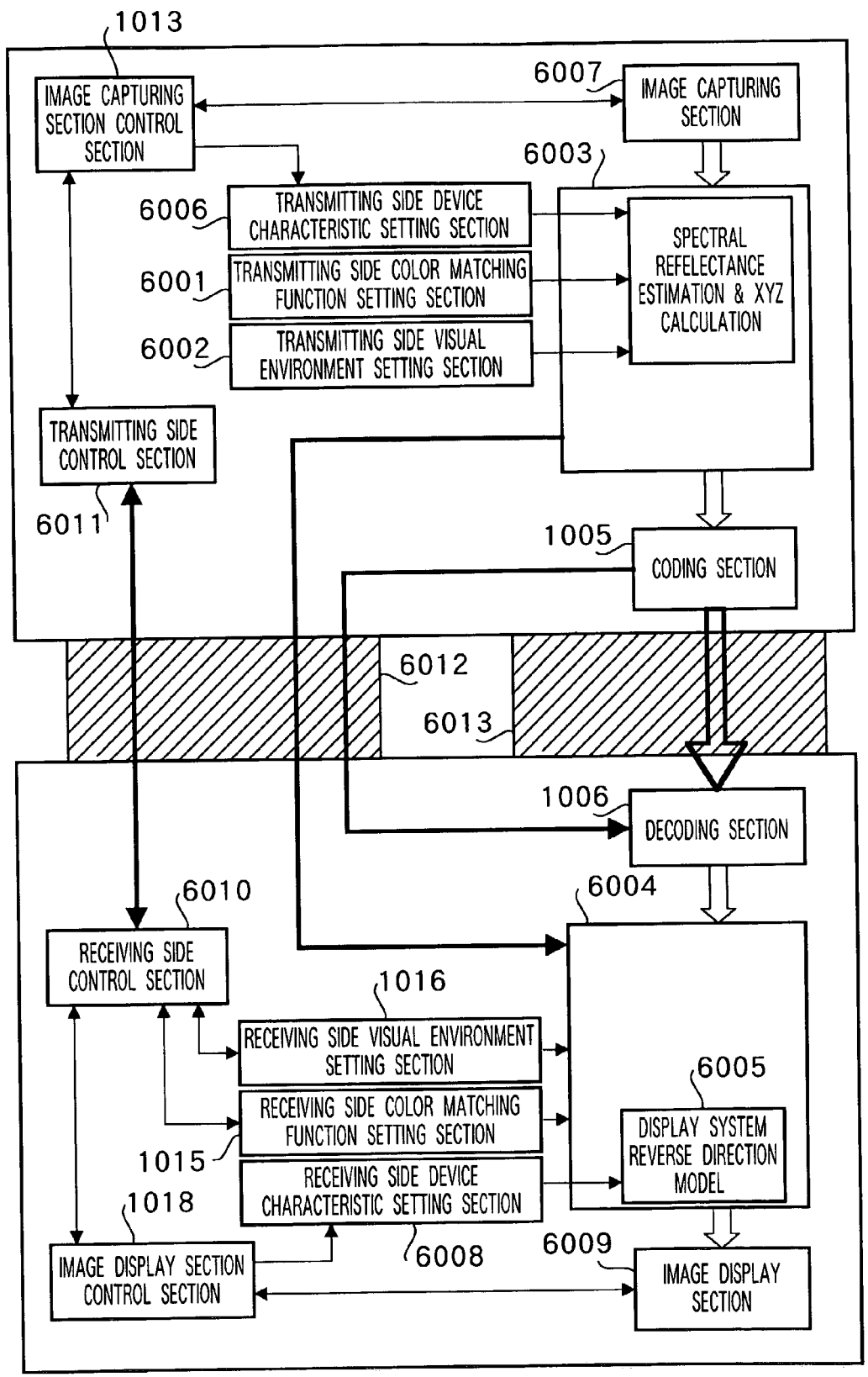
FIG. 6 illustrates a color management apparatus according to Embodiment 4 of the present invention applicable to a color reproduction target #1 and color reproduction task assignment #2 in the case of transmission of colorimetric value XYZ.

FIG. 6 shows a functional block diagram of a color management apparatus according to Embodiment 4 of the present invention. The color management apparatus shown in FIG. 6 is constructed in such a way as to be applicable to color reproduction target #1 and color reproduction task assignment #2. The parts having the same functions as those in the functional block of the color management system shown in FIG. 1 are assigned the same reference numerals.

First, color reproduction target#1 will be explained. As shown in Table 1, color reproduction target #1 is to reproduce the color of an object when viewed in image capturing illumination with the color matching function of the observer on the transmitting side. Therefore, in calculation of colorimetric value XYZ, transmitting side color matching function setting section 6001 supplies a color matching function, which is a color control parameter, and transmitting side visual environment setting section 6002 supplies a spectral distribution of illumination, which is a color control parameter.

Second, color reproduction task assignment #2 will be explained. As shown in Table 2, the transmitting side and receiving side function on an equal basis of color reproduction task assignment #2 and the transmitting side and receiving side exchange color information using colorimetric value XYZ. Therefore, transmit image processing section 6003 assumes both estimation of spectral reflectance of the object and calculation of XYZ. On the other hand, received image processing section 6004 converts colorimetric value XYZ to signal Vo for the display apparatus using display system reverse direction model 6005.

To estimate spectral reflectance of the object, transmitting side device characteristic setting section 6006 supplies the colorimetric input/output characteristic of image capturing section 6007, which is a color control parameter, to transmit image processing section 6003. Furthermore, to calculate signal $V_o$ for the display apparatus, receiving side device characteristic setting section 6008 supplies the colorimetric input/output characteristic of the image display apparatus of image display section 6009, which is a color control parameter, to transmit image processing section 6004.

Third, the flow of color signal conversion will be explained. Image capturing section 6007 supplies signal $V_i$ of the captured image to transmit image processing section 6003. Transmit image processing section 6003 estimates spectral reflectance of the object based on signal $V_i$ of the captured image and the colorimetric input/output characteristic of the image capturing apparatus sent from transmitting side device characteristic setting section 6006. Furthermore, transmit image processing section 6003 converts the spectral reflectance to colorimetric value XYZ using the color matching function sent from transmitting side color matching function setting section 6001 and spectral distribution of illumination sent from transmitting side visual environment setting section 6002. Colorimetric value XYZ is sent to the receiving side through download type transmission path 6012 or packet type transmission path 6013.

Furthermore, display system reverse direction model 6005 converts colorimetric value XYZ to signal $V_o$ for the display apparatus based on the colorimetric input/output characteristic of the image display apparatus given from receiving side device characteristic setting section 6008 and delivers the signal to image display section 6009.

As shown above, Embodiment 4 can provide a color management apparatus capable of appropriately operating each processing section to achieve color reproduction target #1 and color reproduction task assignment #2.

(Embodiment 5)

Figure 7:
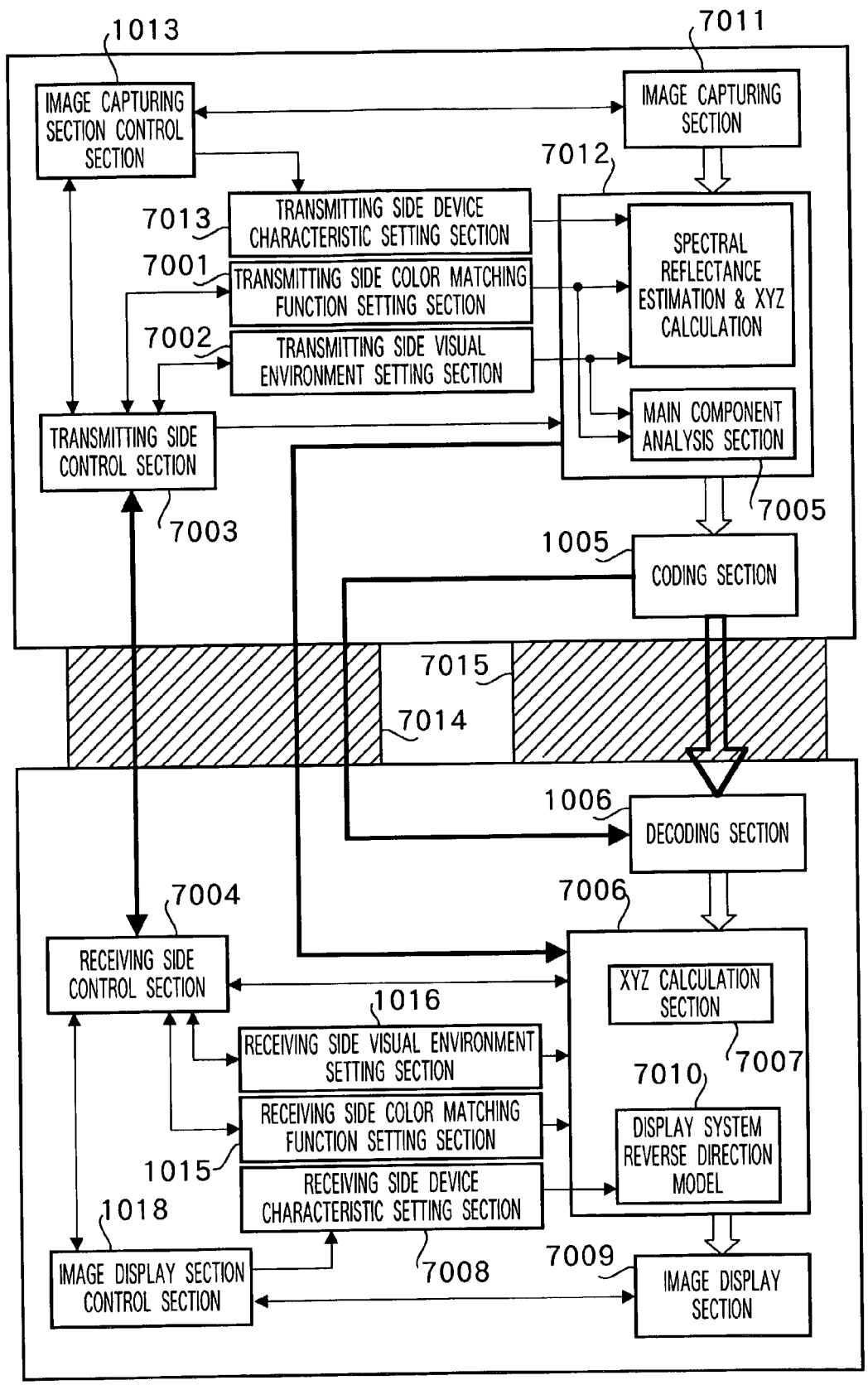
FIG. 7 illustrates a color management apparatus according to Embodiment 5 of the present invention applicable to a color reproduction target #1 and color reproduction task assignment #2 in the case of transmission of a main component coefficient of spectral reflectance.

FIG. 7 shows a functional block diagram of a color management apparatus according to Embodiment 5 of the present invention. The color management apparatus shown in FIG. 7 is constructed in such a way as to be applicable to color reproduction target #1 and color reproduction task assignment #2. The parts having the same functions as those in the functional block of the color management apparatus shown in FIG. 1 are assigned the same reference numerals.

First, color reproduction target #1 will be explained. As shown in Table 1, color reproduction target #1 is to reproduce the color of an object when viewed in image capturing illumination with the color matching function of the observer on the transmitting side. Therefore, in calculation of colorimetric value XYZ, transmitting side color matching function setting section 7001 supplies a color matching function, which is a color control parameter, and transmitting side visual environment setting section 7002 supplies a spectral distribution of illumination, which is a color control parameter.

Second, color reproduction task assignment #2 will be explained. As shown in Table 2, the transmitting side and receiving side function on an equal basis of color reproduction task assignment #2 and the transmitting side and receiving side exchange color information using the main component coefficient of spectral reflectance. The purpose of transmitting the main component coefficient of spectral reflectance is to send spectral information with a limited band and a small number of dimensions. For example, when spectral reflectance is quantized in increments of 5 nm between 400 nm and 700 nm, transmitting the spectral reflectance requires 61 channels. Therefore, spectral reflectance is expressed with 61-dimensional vectors and a main component analysis is applied to generate main component vectors. Then, when vectors are transmitted starting with the first main component of the main component vectors preferentially, it is almost possible to send the original spectral information with the number of channels smaller than 61.

This main component vectors are shared by transmitting side control section 7003 and receiving side control section 7004. More specifically, there are various methods such as a method whereby predetermined main components are kept by transmitting side control section 7003 and receiving side control section 7004 or a method whereby main component analysis section 7005 on the transmitting side calculates main components based on the captured image and transmitting side control section 7003 sends these components to receiving side control section 7004.

On the other hand, XYZ calculation section 7007 of received image processing section 7006 reconstructs the spectral reflectance of the object using the main component coefficient received from the transmitting side and the main component vector sent from receiving side control section 7004. Furthermore, XYZ calculation section 7007 calculates colorimetric value XYZ using the color matching function sent from transmitting side color matching function setting section 7001 through transmitting side control section 7003 and receiving side control section 7004 and the spectral distribution of illumination sent from transmitting side visual environment setting section 7002. Reverse direction model 7010 converts colorimetric value XYZ to signal Vo for the display signal using the colorimetric input/output characteristic of the image display apparatus of image display section 7009 supplied from receiving side device characteristic setting section 7008.

Third, the flow of color signal conversion will be explained. Image capturing section 7011 supplies signal $V_i$ of the captured image to transmit image processing section 7012. Transmit image processing section 7012 estimates spectral reflectance of the object from signal $V_i$ of the captured image based on the colorimetric input/output characteristic of the image capturing apparatus sent from transmitting side device characteristic setting section 7013, which is a color control parameter. When estimation of spectral reflectance is performed in a colorimetric value space, especially a uniform color space such as a CIELAB space and CIELUV space, the estimation accuracy can be improved based on visual errors. Thus, to estimate spectral reflectance, transmit image processing section 7012 is supplied with the color matching function from transmitting side color matching function setting section 7001 and the spectral distribution of illumination from transmitting side visual environment setting section 7002.

Spectral reflectance is given to main component analysis section 7005. Then, main component analysis section 7005 calculates a main component coefficient from the spectral reflectance. Main component analysis section 7005 sends the main component coefficient to the receiving side through download type transmission path 7014 or packet type transmission path 7015. Then, the main component coefficient is supplied to XYZ calculation section 7007. To calculate XYZ, the color matching function and spectral distribution of illumination are supplied from the transmitting side to XYZ calculation section 7007 through receiving side control section 7004.

Display system reverse direction model 7010 converts colorimetric value XYZ to signal Vo for the display apparatus based on the colorimetric input/output characteristic of the image display apparatus given from transmitting side device characteristic setting section 7008, which is a color control parameter and delivers the signal to image display section 7009.

As shown above, Embodiment 5 can provide a color management system capable of appropriately operating each processing section to achieve color reproduction target #1 and color reproduction task assignment #2.

(Embodiment 6)

Figure 8:
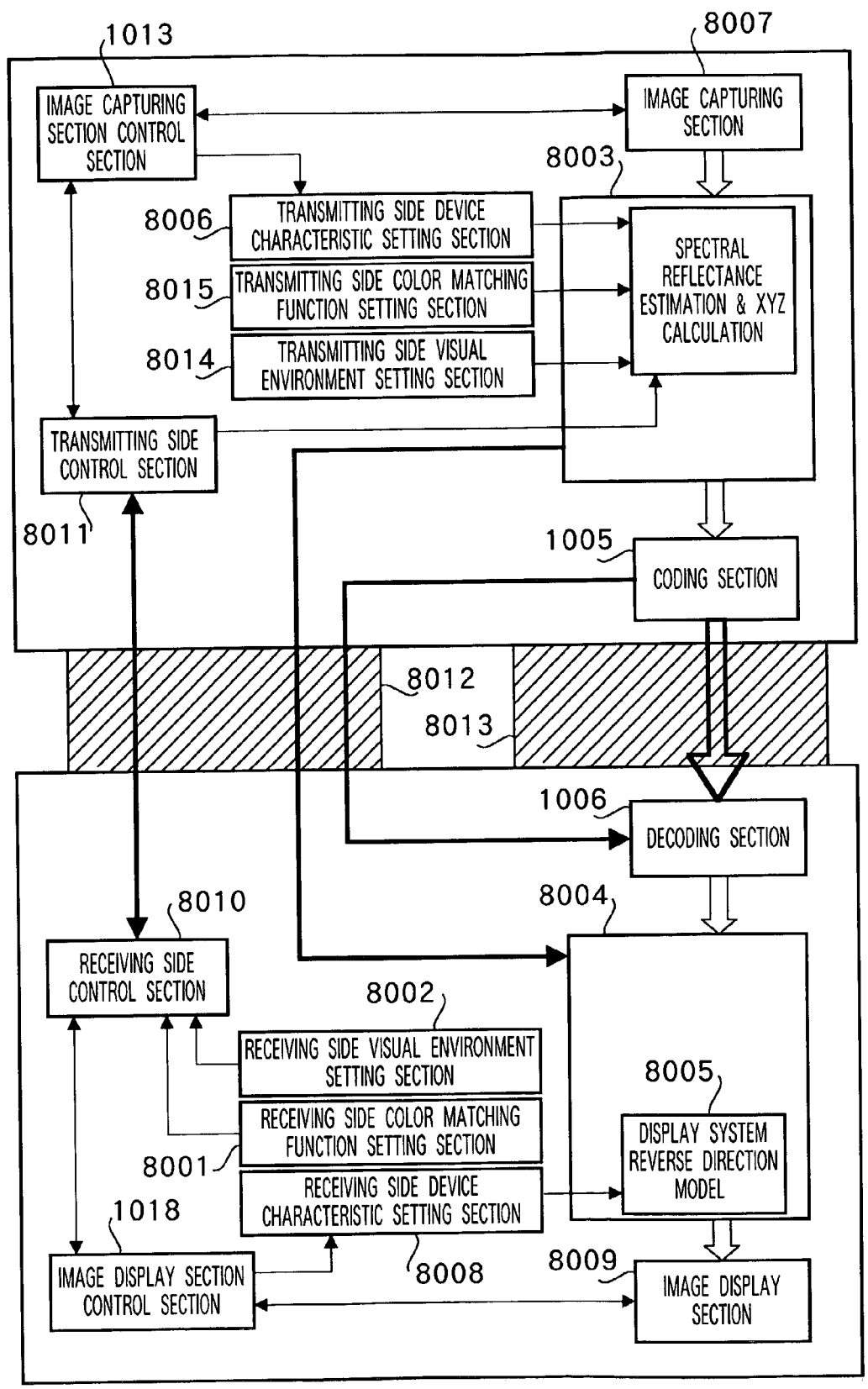
FIG. 8 illustrates a color management apparatus according to Embodiment 6 of the present invention applicable to a color reproduction target #4 and color reproduction task assignment #2.

FIG. 8 shows a functional block diagram of a color management apparatus according to Embodiment 6 of the present invention. The color management apparatus shown in FIG. 8 is constructed in such a way as to be applicable to color reproduction target #4 and color reproduction task assignment #2. The parts having the same functions as those in the functional block of the color management system shown in FIG. 1 are assigned the same reference numerals.

First, color reproduction target #4 will be explained. As shown in Table 1, color reproduction target #4 is to reproduce the color of an object when viewed in observation illumination with the color matching function of the observer on the receiving side. Therefore, in calculation of colorimetric value XYZ, receiving side color matching function setting section 8001 supplies a color matching function, which is a color control parameter, and receiving side visual environment setting section 8002 supplies a spectral distribution of illumination, which is a color control parameter.

Second, color reproduction task assignment #2 will be explained. As shown in Table 2, the transmitting side and receiving side function on an equal basis of color reproduction task assignment #2 and the transmitting side and receiving side exchange color information using colorimetric value XYZ. Therefore, transmit image processing section 8003 assumes both estimation of spectral reflectance of the object and calculation of XYZ. On the other hand, received image processing section 8004 converts colorimetric value XYZ to signal Vo for the display apparatus using display system reverse direction model 8005.

To estimate spectral reflectance of the object, transmitting side device characteristic setting section 8006 supplies the colorimetric input/output characteristic of the image capturing apparatus of image capturing section 8007, which is a color control parameter, to transmit image processing section 8003. Furthermore, to calculate signal Vo for the display apparatus, receiving side device characteristic setting section 8008 supplies the colorimetric input/output characteristic of the image display apparatus of image display section 8009, which is a color control parameter, to received image processing section 8004.

Third, the flow of color signal conversion will be explained. Image capturing section 8007 supplies signal $V_i$ of the captured image to transmit image processing section 8003. Transmit image processing section 8003 estimates spectral reflectance of the object from signal $V_i$ of the captured image based on the colorimetric input/output characteristic of the image capturing apparatus sent from transmitting side device characteristic setting section 8006.

Transmit image processing section 8003 converts the spectral reflectance to colorimetric value XYZ using the color matching function sent from receiving side color matching function setting section 8001 supplied through receiving side control section 8010 and transmitting side control section 8011 and spectral distribution of illumination sent from transmitting side visual environment setting section 8002. Transmitting image processing section 8003 sends colorimetric value XYZ to the receiving side through download type transmission path 8012 or packet type transmission path 8013.

Furthermore, display system reverse direction model 8005 converts colorimetric value XYZ to signal Vo for the display apparatus based on the colorimetric input/output characteristic of the image display apparatus given from receiving side device characteristic setting section 8008 and delivers the signal to image display section 8009.

As shown above, Embodiment 6 can provide a color management apparatus capable of appropriately operating each processing section to achieve color reproduction target #4 and color reproduction task assignment #2.

By the way, a configuration of the color management apparatus applicable to color reproduction target #2 and color reproduction task assignment #2 can be simply understood in this embodiment. That is, as shown in Table 1, since the spectral distribution of illumination is on the receiving side and the color matching function is on the transmitting side according to color reproduction target #2, XYZ in transmit image processing section 8003 is calculated using the information from receiving side visual environment setting section 8002 and transmitting side color matching function setting section 8015. Likewise, a configuration of the color management apparatus applicable to color reproduction target #3 and color reproduction task assignment #2 can be simply understood in this embodiment. That is, as shown in Table 1, since the spectral distribution of illumination is on the transmitting side and the color matching function is on the receiving side according to color reproduction target #3, XYZ in transmit image processing section 8003 is calculated using the information from transmitting side visual environment setting section 8014 and receiving side color matching function setting section 8001.

(Embodiment 7)

Figure 9:
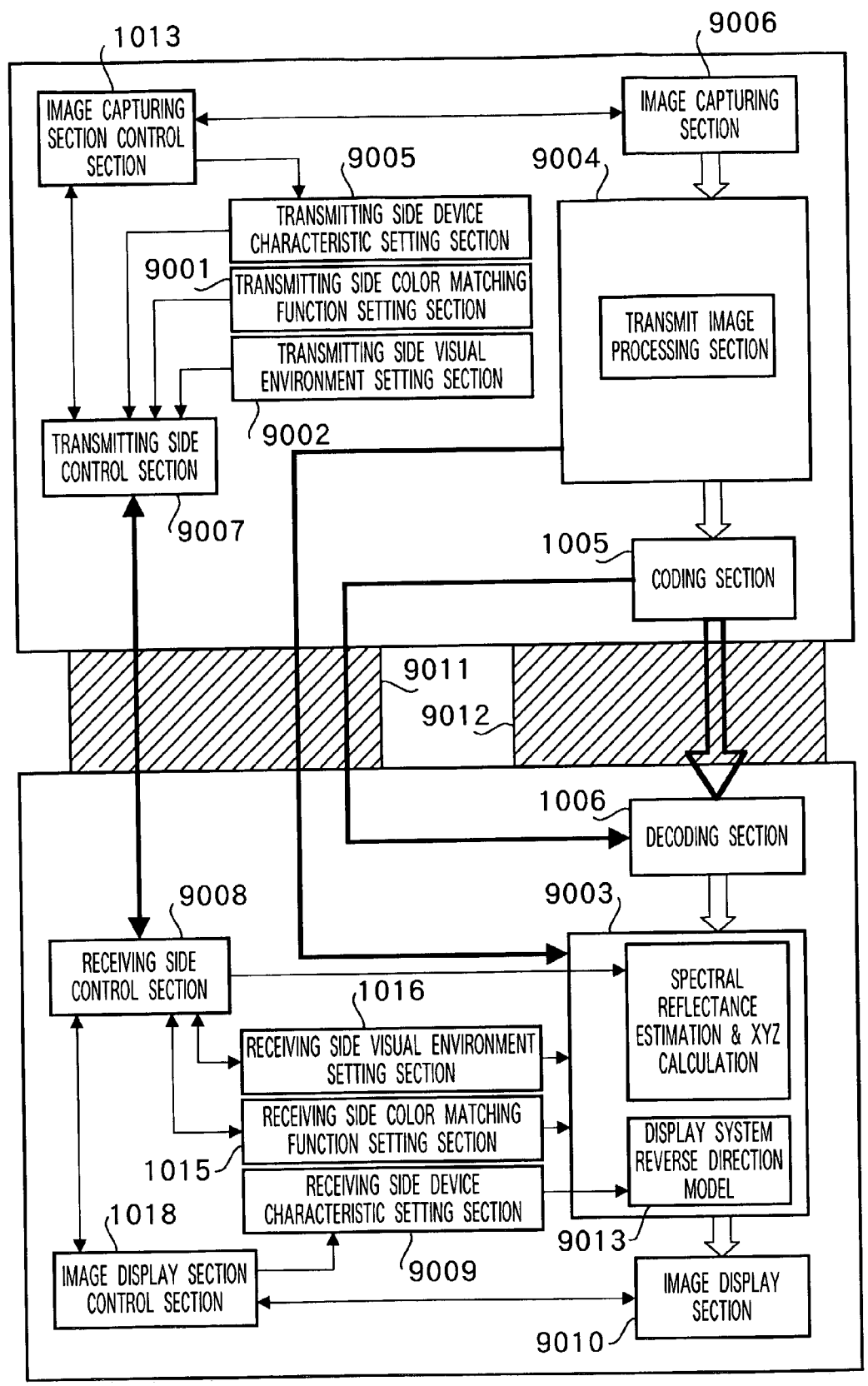
FIG. 9 illustrates a color management apparatus according to Embodiment 7 of the present invention applicable to a color reproduction target #1 and color reproduction task assignment #3.

FIG. 9 shows a functional block diagram of a color management apparatus according to Embodiment 7 of the present invention. The color management apparatus shown in FIG. 9 is constructed in such a way as to be applicable to color reproduction target #1 and color reproduction task assignment #3.

First, color reproduction target #1 will be explained. As shown in Table 1, color reproduction target #1 is to reproduce the color of an object when viewed in image capturing illumination with the color matching function of the observer on the transmitting side. Therefore, in calculation of colorimetric value XYZ, transmitting side color matching function setting section 9001 supplies a color matching function, which is a color control parameter, and transmitting side visual environment setting section 9002 supplies a spectral distribution of illumination, which is a color control parameter.

Second, color reproduction task assignment #3 will be explained. As shown in Table 2, the receiving side plays the main role of color reproduction task assignment #3 and the received image processing section 9003 executes all processing.

The output of transmit image processing section 9004 becomes signal $V_i$ of the captured image. Thus, for estimation of spectral reflectance of the object, transmitting side device characteristic setting section 9005 supplies the colorimetric input/output characteristic of the image capturing apparatus of image capturing section 9006, which is a color control parameter, to received image processing section 9003 through transmitting side control section 9007 and receiving side control section 9008. To calculate colorimetric value XYZ, transmitting side color matching function setting section 9001 supplies the color matching function, which is a color control parameter, to the received image processing section 9003 through transmitting side control section 9007 and receiving side control section 9008. Furthermore, transmitting side visual environment setting section 9002 supplies the spectral distribution of illumination, which is a color control parameter, to received image processing section 9003 through transmitting side control section 9007 and receiving side control section 9008. Furthermore, to calculate signal Vo for the display apparatus, receiving side device characteristic setting section 9009 supplies the colorimetric input/output characteristic of the image display apparatus of image display section 9010, which is a color control parameter, to received image processing section 9003.

Third, the flow of color signal conversion will be explained. Image capturing section 9006 supplies signal $V_i$ of the captured image to transmit image processing section 9004. Transmit image processing section 9004 sends signal $V_i$ of the captured image to the receiving side through download type transmission path 9011 or packet type transmission path 9012 and supplies it to received image processing section 9003. Received image processing section 9003 estimates spectral reflectance of the object from signal $V_i$ of the received captured image based on the colorimetric input/output characteristic of the image capturing apparatus sent from transmitting side device characteristic setting section 9005. Received image processing section 9003 converts the spectral reflectance to colorimetric value XYZ using the color matching function sent from transmitting side color matching function setting section 9001 and spectral distribution of illumination sent from transmitting side visual environment setting section 9002.

Display system reverse direction model 9013 converts colorimetric value XYZ to signal $V_o$ for the display apparatus based on the colorimetric input/output characteristic of the image display apparatus given from receiving side device characteristic setting section 9009. Then, display system reverse direction model 9013 delivers signal $V_o$ for the display apparatus to image display section 9010.

As shown above, Embodiment 7 can provide a color management system capable of appropriately operating each processing section to achieve color reproduction target #1 and color reproduction task assignment #3.

(Embodiment 8)

Figure 10:
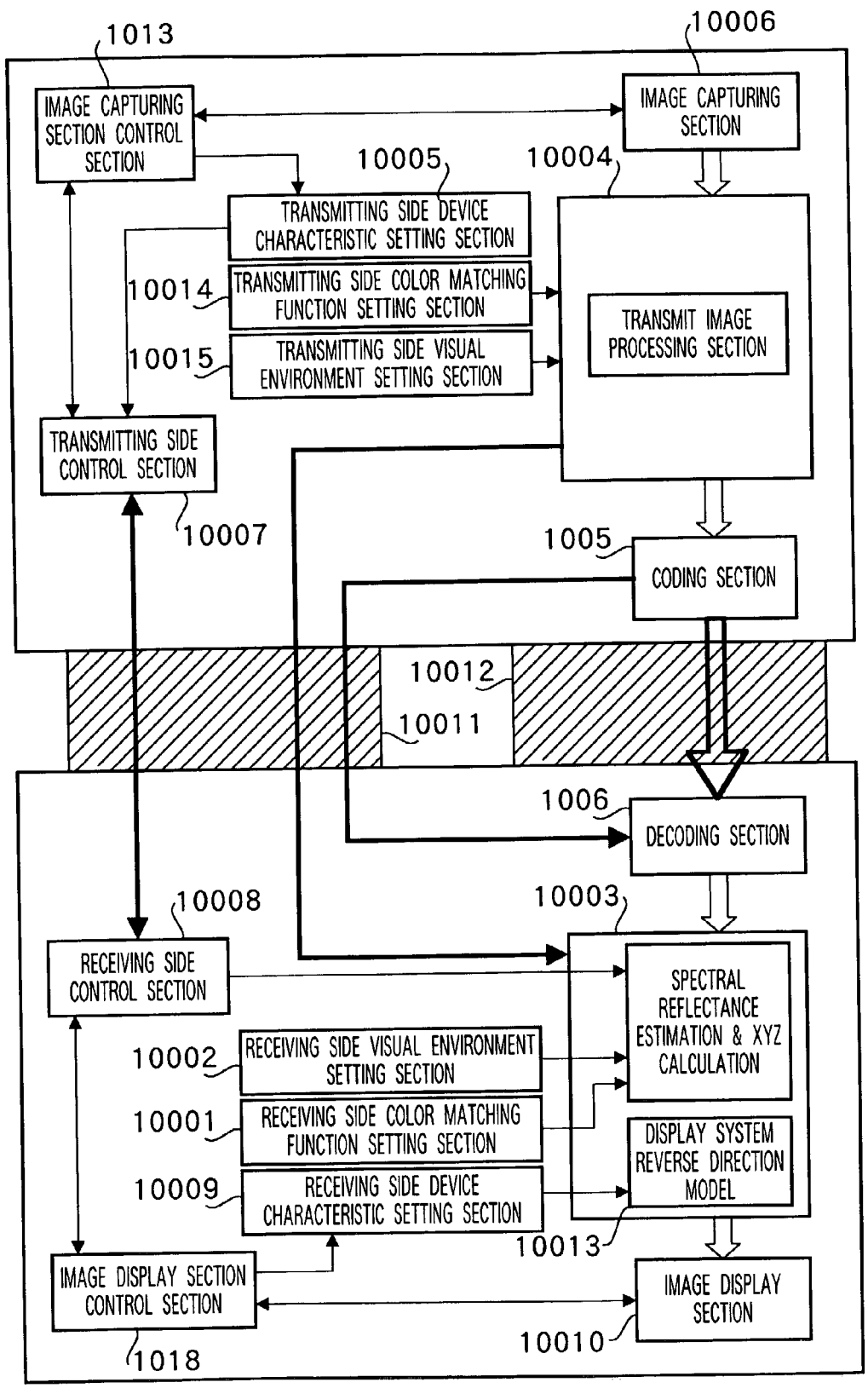
FIG. 10 illustrates a color management apparatus according to Embodiment 8 of the present invention applicable to a color reproduction target #4 and color reproduction task assignment #3.

FIG. 10 shows a functional block diagram of a color management apparatus according to Embodiment 8 of the present invention. The color management apparatus shown in FIG. 10 is constructed in such a way as to be applicable to color reproduction target #4 and color reproduction task assignment #3.

First, color reproduction target #4 will be explained. As shown in Table 1, color reproduction target #4 is to reproduce the color of an object in observation illumination (receiving side) when viewed with the color matching function of the observer on the receiving side. Therefore, in calculation of colorimetric value XYZ, receiving side color matching function setting section 10001 supplies a color matching function, which is a color control parameter, and receiving side visual environment setting section 10002 supplies a spectral distribution of illumination, which is a color control parameter.

Second, color reproduction task assignment #3 will be explained. As shown in Table 2, the receiving side plays the main role of color reproduction task assignment #3 and the received image processing section 10003 executes all processing.

The output of transmit image processing section 10004 becomes signal $V_i$ of the captured image. Thus, for estimation of spectral reflectance of the object, transmitting side device characteristic setting section 10005 supplies the colorimetric input/output characteristic of the image capturing apparatus of image capturing section 10006, which is a color control parameter, to received image processing section 10003 through transmitting side control section 10007 and receiving side control section 10008. To calculate colorimetric value XYZ, receiving side color matching function setting section 10001 supplies the color matching function, which is a color control parameter, to the received image processing section 10003 and receiving side visual environment setting section 10002 supplies spectral distribution of illumination to received image processing section 10003.

Furthermore, to calculate signal Vo for the display apparatus, receiving side device characteristic setting section 10009 supplies the colorimetric input/output characteristic of the image display apparatus of image display section 10010, which is a color control parameter, to received image processing section 10003.

Third, the flow of color signal conversion will be explained. Image capturing section 10006 supplies signal $V_i$ of the captured image to transmit image processing section 10004. Transmit image processing section 10004 sends signal $V_i$ of the captured image to the receiving side through download type transmission path 10011 or packet type transmission path 10012 and supplies it to received image processing section 10003.

Received image processing section 10003 estimates spectral reflectance of the object from signal $V_i$ of the received captured image based on the colorimetric input/output characteristic of the image capturing apparatus sent from transmitting side device characteristic setting section 10005. The spectral reflectance is converted to colorimetric value XYZ using the color matching function sent from receiving side color matching function setting section 10001 and spectral distribution of illumination sent from receiving side visual environment setting section 10002.

Display system reverse direction model 10013 converts colorimetric value XYZ to signal Vo for the display apparatus based on the colorimetric input/output characteristic of the image display apparatus given from receiving side device characteristic setting section 10009. Then, display system reverse direction model 10013 delivers signal Vo for the display apparatus to image display section 10010.

As shown above, Embodiment 8 can provide a color management apparatus capable of appropriately operating each processing section to achieve color reproduction target #4 and color reproduction task assignment #3.

By the way, a configuration of the color management apparatus applicable to color reproduction target #2 and color reproduction task assignment #3 can be simply understood in this embodiment. That is, as shown in Table 1, since the spectral distribution of illumination is on the receiving side and the color matching function is on the transmitting side according to color reproduction target #2, XYZ in received image processing section 10003 is calculated using the information from transmitting side color matching function setting section 10001 and receiving side visual environment setting section 10002.

Likewise, a configuration of the color management apparatus applicable to color reproduction target #3 and color reproduction task assignment #3 can be simply understood in this embodiment. That is, as shown in Table 1, since the spectral distribution of illumination is on the transmitting side and the color matching function is on the receiving side according to color reproduction target #3, XYZ in received image processing section 10003 is calculated using the information from transmitting side visual environment setting section 10015 and receiving side color matching function setting section 10001.

The above-described color management apparatus can also be constructed so that each function is implemented by a processor that executes a program or only sections requiring high-speed processing can be made up of hardware.

Furthermore, it is also possible to set parameters by making an arrangement with the receiving side or transmitting side about only one of the color reproduction target or color reproduction task assignment as required or it is also possible to exchange only necessary information instead of exchanging all of device information, color matching function and visual environment information.

As shown above, the present invention allows the transmitting side and receiving side to share a common target of color reproduction and exchange the device characteristic, color matching function and visual environment information according to task assignment of color reproduction pursuant with target of color reproduction, thus making it possible to provide a color management apparatus and color management system which can flexibly meet a plurality of color reproduction targets and color reproduction tasks assigned.

The present invention is not limited to the above-described described embodiments, and various variations and modifications may be possible without departing from the scope of the present invention.

This application is based on the Japanese Patent Application No. 2001-132191 filed on Apr. 27, 2001, entire content of which is expressly incorporated by reference herein.

What is claimed is:

1. A color management apparatus on a transmitting side of a color management system that captures and sends images to a color management apparatus on a receiving side of the color management system, the transmitting side color management apparatus comprising:
   a transmitting side controller that provides instructions for capturing an image to be displayed at the receiving side color management apparatus; that determines a target by selecting from a plurality of color reproduction targets by selecting one of transmitting side visual environment information and receiving side visual environment information and one of a transmitting side color matching function and a receiving side color matching function; that transmits at least one of a device characteristic, a selected transmitting side visual environment information and a selected transmitting side color matching function to the receiving side according to a task assignment of color reproduction of the transmitting side and the receiving side for the target; and that sets transmitting side color control parameters; and
   a transmit image processor that converts the captured image to an image signal using the transmitting side color control parameters and that sends the image signal to the receiving side.

2. The color management system according to claim 1, wherein a colorimetric value of the displayed image is maintained within an allowable error range of a spectral reflectance distribution of the captured image.

3. The color management system according to claim 2, wherein determining the selected target comprises selecting one of the following sets:
   a color matching function on the transmitting side and a colorimetric value of the captured image calculated from the visual environment information on the transmitting side;
   a color matching function on the receiving side and a colorimetric value of the displayed image calculated from the visual environment information on the receiving side;
   the color matching function on the transmitting side and the colorimetric value of the displayed image calculated from the visual environment information on the receiving side; and
   the color matching function on the receiving side and the colorimetric value of the captured image calculated from the visual environment information on the transmitting side.

4. A color management apparatus on a receiving side of a color management system that displays images received from a color management apparatus on a transmitting side of the color management system, the receiving side color management apparatus comprising:
   a receiving side controller that determines a target by selecting from a plurality of color reproduction targets by selecting one of transmitting side visual environment information and receiving side visual environment information and one of a transmitting side color matching function and a receiving side color matching function; that transmits at least one of a device characteristic, a selected receiving side visual environment information and a selected receiving side color matching function to the transmitting side according to a task assignment of color reproduction of the transmitting side and the receiving side for the target; that sets receiving side color control parameters; and that provides instructions for an image signal received from the transmitting side to be displayed; and
   a received image processor that converts the received image signal to a display image signal to be displayed on an image display using the receiving side color control parameters.

5. The color management apparatus according to claim 4, wherein a colorimetric value of the displayed image is maintained within an allowable error range of a spectral reflectance distribution of the captured image.

6. The color management apparatus according to claim 5, wherein determining the selected target comprises selecting one of the following sets:
   a color matching function on the transmitting side and a colorimetric value of the captured image calculated from the visual environment information on the transmitting side;
   a color matching function on the receiving side and a colorimetric value of the displayed image calculated from the visual environment information on the receiving side;
   the color matching function on the transmitting side and the colorimetric value of the displayed image calculated from the visual environment information on the receiving side; and
   the color matching function on the receiving side and the colorimetric value of the captured image calculated from the visual environment information on the transmitting side.

7. A color management system, having a transmitting side apparatus and a receiving side apparatus, that performs overall color control in image capturing, transmission and image display, the color management system comprising:
   a transmitting side controller that provides instructions for capturing an image to be displayed at the receiving side color management apparatus; that determines a transmitting side target by selecting from a plurality of color reproduction targets by selecting one of transmitting side visual environment information and receiving side visual environment information and one of a transmitting side color matching function and a receiving side color matching function; that transmits at least one of a device characteristic, a selected transmitting side visual environment information and a selected transmitting side color matching function to the receiving side according to a task assignment of color reproduction; and that sets transmitting side color control parameters;
   a transmit image processor that converts the captured image to an image signal using the transmitting side color control parameters and that causes the image signal to be sent to the receiving side apparatus;
   a receiving side controller that determines a receiving side target by selecting from the plurality of color reproduction targets by selecting one of the transmitting side visual environment information and the receiving side visual environment information and one of the transmitting side color matching function and the receiving side color matching function; that transmits at least one of a device characteristic, a selected receiving side visual environment information and a selected receiving side color matching function to the transmitting side according to the task assignment of color reproduction; that sets receiving side color control parameters; and that provides instructions for the image signal sent from the transmitting side to be displayed; and a received image processor that converts the image signal to a display image signal to be displayed on an image display using the receiving side color control parameters.

8. The color management system according to claim 7, wherein the target and the task assignment of color reproduction are determined by said transmitting side controller, wherein said receiving side controller is subordinate thereto.

9. The color management system according to claim 7, wherein the target and the task assignment of color reproduction are determined by said receiving side controller, wherein said transmitting side controller is subordinate thereto.

10. The color management system according to claim 7, wherein the target and the task assignment of color reproduction are determined by an arrangement between said transmitting side controller and said receiving side controller.

11. The color management system according to claim 7, wherein said transmit image processor comprises a display reverse direction model that estimates a spectral reflectance distribution of the image based on an output of an image capturer that operates according to instructions of said transmitting side controller; that calculates a colorimetric value of the image based on the spectral reflectance distribution, the color matching function on said transmitting side or the color matching function on said receiving side and the visual environment information on said transmitting side or the visual environment information on said receiving side; and that converts the colorimetric value of the image to the display signal based on the colorimetric input/output characteristic of the image display on said receiving side.

12. The color management system according to claim 7, wherein said received image processor comprises a display reverse direction model that estimates a spectral reflectance distribution of the image based on an output of said transmit image processor that operates according to instructions of said receiving side controller; that calculates a colorimetric value of the image based on the spectral reflectance distribution, the color matching function on said transmitting side or the color matching function on said receiving side and the visual environment information on said transmitting side or the visual environment information on said receiving side; and that converts the colorimetric value of the image to the display signal based on the colorimetric input/output characteristic of the image display on said receiving side.

13. A color management method on a transmitting side for sending images captured on the transmitting side to a receiving side to be displayed, the method comprising:

capturing an image to be displayed at the receiving side;

determining a target from a plurality of color reproduction targets by selecting one of transmitting side visual environment information and receiving side visual environment information and one of a transmitting side color matching function and a receiving side color matching function;

transmitting at least one of a device characteristic, a selected transmitting side visual environment information and a selected transmitting side color matching function to the receiving side according to a task assignment of color reproduction;

setting at least one transmitting side color control parameter;

converting the captured image to an image signal for transmission using the at least one transmitting side color control parameter; and sending the image signal to the receiving side.

14. A color management method on the receiving side for displaying images captured on a transmitting side and sent to the receiving side to be displayed, the method comprising:

receiving an image signal of an image captured on the transmitting side;

determining a target from a plurality of color reproduction targets by selecting one of transmitting side visual environment information and receiving side visual environment information and one of a transmitting side color matching function and a receiving side color matching function;

transmitting at least one of a device characteristic, a selected receiving side visual environment information and a selected receiving side color matching function to the transmitting side according to a task assignment of color reproduction;

setting at least one receiving side color control parameter; and converting the image signal to a display image signal to be displayed on an image display using the at least one receiving side color control parameter.

15. A computer readable medium that stores a color management computer program for capturing and processing images on a transmitting side and sending the images to a receiving side, the computer readable medium comprising:

a capturing code segment that captures an image;

a determining code segment that determines a target from a plurality of color reproduction targets by selecting one of transmitting side visual environment information and receiving side visual environment information and one of a transmitting side color matching function and a receiving side color matching function;

a transmitting code segment that causes at least one of a device characteristic, a selected transmitting side visual environment information and a selected transmitting side color matching function to be transmitted to the receiving side according to a task assignment of color reproduction;

a setting code segment that sets at least one transmitting side color control parameter;

a converting code segment that converts the captured image to an image signal using the at least one transmitting side color control parameter; and a sending code segment that causes the image signal to be sent to the receiving side.

16. A computer readable medium that stores a color management computer program for displaying images on a receiving side, the images being captured on a transmitting side and sent to the receiving side, the computer readable medium comprising:

a receiving code segment that receives an image signal of an image captured on the transmitting side;

a determining code segment that determines a target from a plurality of color reproduction targets by selecting one of transmitting side visual environment information and receiving side visual environment information and one of a transmitting side color matching function and a receiving side color matching function;

a transmitting code segment that causes at least one of a device characteristic, a selected receiving side visual environment information and a selected receiving side color matching function to be transmitted to the transmitting side according to a task assignment of color reproduction;

a setting code segment that sets at least one receiving side color control parameter; and a converting code segment that converts the received image signal to a display image signal to be displayed on an image display using the at least one receiving side color control parameter.

* * * * *